United States Patent
Zhou

(10) Patent No.: US 12,406,089 B2
(45) Date of Patent: Sep. 2, 2025

(54) DETECTION METHOD AND APPARATUS, AND NON-TRANSITORY COMPUTER READABLE STORAGE MEDIUM

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventor: Min Zhou, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 289 days.

(21) Appl. No.: 18/043,702

(22) PCT Filed: Sep. 14, 2021

(86) PCT No.: PCT/CN2021/118159
§ 371 (c)(1),
(2) Date: Mar. 1, 2023

(87) PCT Pub. No.: WO2022/062958
PCT Pub. Date: Mar. 31, 2022

(65) Prior Publication Data
US 2023/0267228 A1 Aug. 24, 2023

(30) Foreign Application Priority Data
Sep. 23, 2020 (CN) .................. 202011009152.X

(51) Int. Cl.
*G06F 21/62* (2013.01)
*G06F 21/56* (2013.01)
(Continued)

(52) U.S. Cl.
CPC ........ *G06F 21/6245* (2013.01); *G06F 21/566* (2013.01); *G06F 21/577* (2013.01); *G06F 21/6227* (2013.01); *G06F 21/64* (2013.01)

(58) Field of Classification Search
CPC .. G06F 21/6245; G06F 21/566; G06F 21/577; G06F 21/6227; G06F 21/64; G06F 2221/033; G06F 16/9566
See application file for complete search history.

(56) References Cited

U.S. PATENT DOCUMENTS

| | | | | |
|---|---|---|---|---|
| 8,856,869 | B1 * | 10/2014 | Brinskelle | H04L 63/0823 726/2 |
| 8,997,231 | B2 * | 3/2015 | Karta | H04L 63/1425 726/1 |

(Continued)

FOREIGN PATENT DOCUMENTS

| | | |
|---|---|---|
| CN | 106778254 A | 5/2017 |
| CN | 107103240 A | 8/2017 |

(Continued)

OTHER PUBLICATIONS

"International Search Report and English language translation", International Application No. PCT/CN2021/118159, Dec. 15, 2021, 7 pp.

(Continued)

*Primary Examiner* — Carl G Colin
*Assistant Examiner* — Andrew Suh
(74) *Attorney, Agent, or Firm* — Myers Bigel, P.A.

(57) ABSTRACT

A detection method and apparatus. The detection method includes: performing static stain analysis on an application to be tested to obtain at least one static stain propagation path, each static stain propagation path including a source interface identifier and a destination interface identifier; performing static analysis on the application to obtain the static analysis result; performing dynamic behavior analysis (Continued)

on the application to obtain the dynamic behavior analysis result; obtaining communication flow data throughout the life cycle of the application; taking sensitive information and the category of sensitive information corresponding to the communication URL as the flow analysis result; and fusing the static analysis result, the dynamic behavior analysis result, and the flow analysis result to obtain the detection result.

20 Claims, 3 Drawing Sheets

(51) Int. Cl.
*G06F 21/57* (2013.01)
*G06F 21/64* (2013.01)

(56) References Cited

U.S. PATENT DOCUMENTS

| | | | | |
|---|---|---|---|---|
| 9,058,490 | B1* | 6/2015 | Barker | G06F 21/566 |
| 10,313,370 | B2* | 6/2019 | Xiao | G06F 21/563 |
| 2015/0242635 | A1 | 8/2015 | Li et al. | |
| 2015/0264105 | A1* | 9/2015 | V | H04L 67/02 709/201 |
| 2021/0336928 | A1* | 10/2021 | Sofer | G06F 21/6263 |

FOREIGN PATENT DOCUMENTS

| | | |
|---|---|---|
| CN | 107832619 A | 3/2018 |
| CN | 108334780 A | 7/2018 |
| CN | 109145603 A | 1/2019 |
| CN | 110287722 A | 9/2019 |
| CN | 111353146 A | 6/2020 |
| KR | 20140008860 A | 1/2014 |

OTHER PUBLICATIONS

"Notice of the First Review Opinion", CN Application No. 202011009152.X, Jul. 7, 2024, 18 pp.
"Notice of Grant of Invention Patent Right" and English language translation, CN Application No. 202011009152.X, Dec. 12, 2024, 10 pp.
Lu, et al., "Android Settings—Security Analysis and Evlauation for the Usage of Settings Mechanism in Android" with English language Abstract, Journal of Computer Research and Development, vol. 53, No. 10, 2016, pp. 2248-2261.

* cited by examiner

S110: performing static taint analysis on an application to be detected to obtain at least one static taint propagation path S120: performing static analysis on the application to be detected to obtain a static analysis result S130: performing dynamic behavior analysis on the application to be detected to obtain a dynamic behavior analysis result S140: acquiring communication flow data in an entire lifetime of the application to be detected S150: determining sensitive information and a sensitive information category that correspond to the communication URL, as a flow analysis result S160: fusing the static analysis result, the dynamic behavior analysis result, and the flow analysis result to obtain a detection result

Fig. 1

S121: according to the permission-related information of the at least one privacy-related interface, the permission-related information of the at least one third-party SDK, and the at least one static taint propagation path, construct static privacy context information of each static taint propagation path S122: perform static analysis on the application to be detected by using the static privacy context information of the at least one static taint propagation path, to obtain the static analysis result

Fig. 2

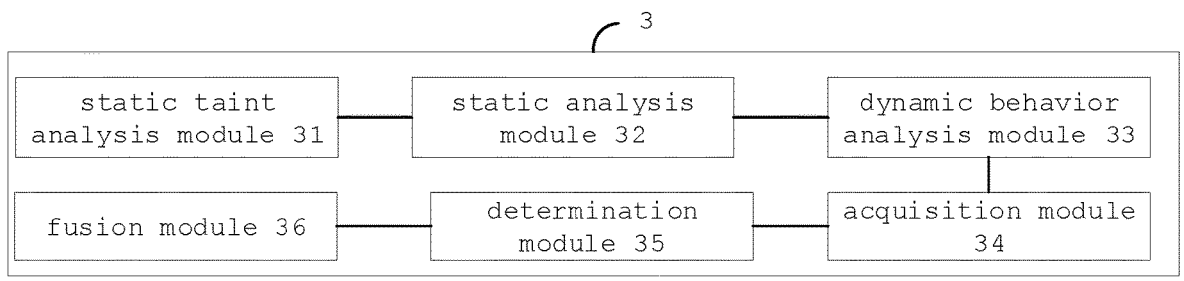

Fig. 3

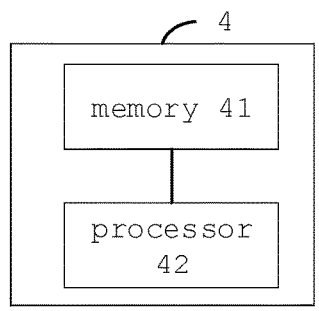

Fig. 4

DETECTION METHOD AND APPARATUS, AND NON-TRANSITORY COMPUTER READABLE STORAGE MEDIUM

CROSS-REFERENCE TO RELATED APPLICATIONS

The present disclosure is a U.S. National Stage Application under 35 U.S.C. § 371 of International Patent Application No. PCT/CN2021/118159, filed on Sep. 14, 2021, which is based on and claims priority of Chinese application for invention No. 202011009152.X, filed on Sep. 23, 2020, the disclosure of both of which are hereby incorporated into this disclosure by reference in its entirety.

TECHNICAL FIELD

This disclosure relates to the field of computer technologies, and in particular, to a detection method and apparatus, and a non-transitory computer readable storage medium.

BACKGROUND

In recent years, with the gradual popularity of the Android operating system, Android applications have been growing sharply. The Android applications, while bringing convenience to a user, also bring threats to privacy data such as personal information of the user.

In the related art, static analysis is performed on the android applications according to permission information of a privacy-related interface, or dynamic behavior analysis is performed on the android applications by executing the android applications.

SUMMARY

According to a first aspect of the present disclosure, there is provided a detection method, comprising: performing static taint analysis on an application to be detected to obtain at least one static taint propagation path, each static taint propagation path comprising a source interface identification and a destination interface identification; performing, according to permission-related information of at least one privacy-related interface, permission-related information of at least one third-party software development kit (SDK), and the at least one static taint propagation path, static analysis on the application to be detected to obtain a static analysis result; performing dynamic behavior analysis on the application to be detected to obtain a dynamic behavior analysis result; acquiring communication flow data in an entire lifetime of the application to be detected, the communication flow data comprising a communication uniform resource locator (URL) and a communication data packet; determining, according to the communication data packet corresponding to the communication URL, sensitive information and a sensitive information category that correspond to the communication URL, as a flow analysis result; and fusing the static analysis result, the dynamic behavior analysis result, and the flow analysis result to obtain a detection result.

In some embodiments, the performing static analysis on the application to be detected to obtain a static analysis result comprises: constructing static privacy context information of the each static taint propagation path according to the permission-related information of the at least one privacy-related interface, the permission-related information of the at least one third-party SDK, and the at least one static taint propagation path; and performing static analysis on the application to be detected by using the static privacy context information of the at least one static taint propagation path to obtain the static analysis result.

In some embodiments, the permission-related information of each privacy-related interface comprises a privacy-related interface identification and other interface permission-related information, the permission-related information of each third-party SDK comprises an SDK identification, at least one SDK privacy path where the each third-party SDK is located, and other SDK permission-related information, and the constructing static privacy context information of the each static taint propagation path comprises: for the each static taint propagation path, in a case where the source interface identification belongs to the privacy-related interface identification in the permission-related information of the at least one privacy-related interface, acquiring other interface permission information corresponding to the source interface identification; acquiring a path where a destination interface corresponding to the destination interface identification of the each static taint propagation path is located; in a case where the path where the destination interface is located belongs to the at least one SDK privacy path in the permission-related information of the at least one third-party SDK, acquiring other SDK permission information corresponding to the path where the destination interface is located; and constructing the static privacy context information of the each static taint propagation path according to the source interface identification, the other interface permission information corresponding to the source interface identification, the destination interface identification, the path where the destination interface is located, and the other SDK permission information corresponding to the path where the destination interface is located.

In some embodiments, the static analysis comprises privacy type determination, the other interface permission information comprises actual permission information which is permission information actually used when the privacy-related interface is called, and the performing static analysis on the application to be detected by using the static privacy context information of the at least one static taint propagation path comprises: determining, according to a correspondence between a privacy type and the actual permission information and actual permission information in the static privacy context information of the each static taint propagation path, a privacy type of the static privacy context information of the each static taint propagation path, as a part of the static analysis result.

In some embodiments, the static analysis comprises redundant permission determination, the other interface permission information comprises actual permission information which is permission information actually used when the privacy-related interface is called, and the performing static analysis on the application to be detected by using the static privacy context information of the at least one static taint propagation path comprises: acquiring at least one piece of manifest permission information of the application to be detected, the manifest permission information characterizing permission information possibly used by the application to be detected in the lifetime; and for each piece of the manifest permission information, in a case where actual permission information in static privacy context information of any static taint propagation path is not the manifest permission information, determining that the manifest permission information belongs to a redundant permission, as a part of the static analysis result.

In some embodiments, the performing static analysis on the application to be detected by using the static privacy context information of the at least one static taint propagation path further comprises: for the each piece of the manifest permission information, in a case where the actual permission information in static privacy context information of at least one static taint propagation path is the manifest permission information, determining that the static privacy context information of the at least one static taint propagation path belongs to a use scene of the manifest permission information corresponding to the actual permission information, as a part of the static analysis result.

In some embodiments, the static analysis comprises redundant path determination, and the performing static analysis on the application to be detected by using the static privacy context information of the at least one static taint propagation path comprises: acquiring at least one piece of manifest permission information of the application to be detected, the manifest permission information characterizing permission information possibly used by the application to be detected in the lifetime; and for actual permission information in the static privacy context information of the each static taint propagation path, in a case where the actual permission information does not belong to the at least one piece of manifest permission information, determining that the static privacy context information of the each static taint propagation path belongs to a redundant path, as a part of the static analysis result.

In some embodiments, the performing static analysis on the application to be detected by using the static privacy context information of the at least one static taint propagation path further comprises: in a case where the actual permission information belongs to the at least one piece of manifest permission information, determining that the static privacy context information of the each static taint propagation path belongs to a use scene of manifest permission information corresponding to the actual permission information, as a part of the static analysis result.

In some embodiments, the determining, according to the communication data packet corresponding to the communication URL, sensitive information and a sensitive information category that correspond to the communication URL comprises: detecting the communication data packet corresponding to the communication URL to obtain sensitive information conforming to a preset rule, as the sensitive information corresponding to the communication URL; and determining the sensitive information category corresponding to the communication URL according to a correspondence between the preset rule and the sensitive information category.

In some embodiments, the performing dynamic behavior analysis on the application to be detected to obtain a dynamic behavior analysis result comprises: in a process of running the application to be detected, monitoring a plurality of preset privacy-related interface functions to obtain dynamic privacy context information corresponding to each privacy-related interface function, as a part of the dynamic behavior analysis result; in the process of running the application to be detected, monitoring a screen state change of the application to be detected; in a case where the screen state change occurs, analyzing a current running interface to obtain property values of a plurality of properties of each control; for the each control, acquiring a property value of at least one specified property from the property values of the plurality of properties; and for the each control, in a case where the property value of the at least one specified property meets a preset condition, performing, on the each control, a target operation corresponding to the preset condition met by the property value.

In some embodiments, the performing dynamic behavior analysis on the application to be detected to obtain a dynamic behavior analysis result further comprises: acquiring an identification of at least one specific component of the application to be detected and a running sequence of the at least one specific component; according to the running sequence, starting the specific component corresponding to the identification of each specific component in sequence, and controlling each started specific component to run for a specified duration; and performing a screen capture operation on a running interface corresponding to the each started specific component, to obtain a screen capture of the running interface, as a part of the dynamic behavior analysis result.

According to a second aspect of the present disclosure, there is provided a detection apparatus, comprising: a static taint analysis module configured to perform static taint analysis on an application to be detected to obtain at least one static taint propagation path, each static taint propagation path comprising a source interface identification and a destination interface identification; a static analysis module configured to perform, according to permission-related information of at least one privacy-related interface, permission-related information of at least one third-party software development kit (SDK), and the at least one static taint propagation path, static analysis on the application to be detected to obtain a static analysis result; a dynamic behavior analysis module configured to perform dynamic behavior analysis on the application to be detected to obtain a dynamic behavior analysis result; an acquisition module configured to acquire communication flow data in an entire lifetime of the application to be detected, the communication flow data comprising a communication uniform resource locator (URL) and a communication data packet; a determination module configured to determine, according to the communication data packet corresponding to the communication URL, sensitive information and a sensitive information category that correspond to the communication URL, as a flow analysis result; and a fusion module configured to fuse the static analysis result, the dynamic behavior analysis result, and the flow analysis result to obtain a detection result.

According to a third aspect of the present disclosure, there is provided a detection apparatus, comprising: a memory; and a processor coupled to the memory, the processor being configured to perform, based on instructions stored in the memory, the detection method according to any of the above embodiments.

According to a fourth aspect of the present disclosure, there is provided a non-transitory computer readable storage medium having thereon stored computer program instructions which, when executed by a processor, implement the detection method according to any of the above embodiments.

BRIEF DESCRIPTION OF THE DRAWINGS

The accompanying drawings, which constitute a part of the specification, illustrate embodiments of the present disclosure and together with the description, serve to explain the principles of the present disclosure.

The present disclosure can be more clearly understood according to the following detailed description with reference to the accompanying drawings, in which:

FIG. 1 is a flow diagram illustrating a detection method according to some embodiments of the present disclosure;

FIG. 2 is a flow diagram illustrating performing static analysis on the application to be detected to obtain a static analysis result according to some embodiments of the present disclosure;

FIG. 3 is a block diagram illustrating a detection apparatus according to some embodiments of the present disclosure;

FIG. 4 is a block diagram illustrating a detection apparatus according to other embodiments of the present disclosure;

DETAILED DESCRIPTION

Figure 5:
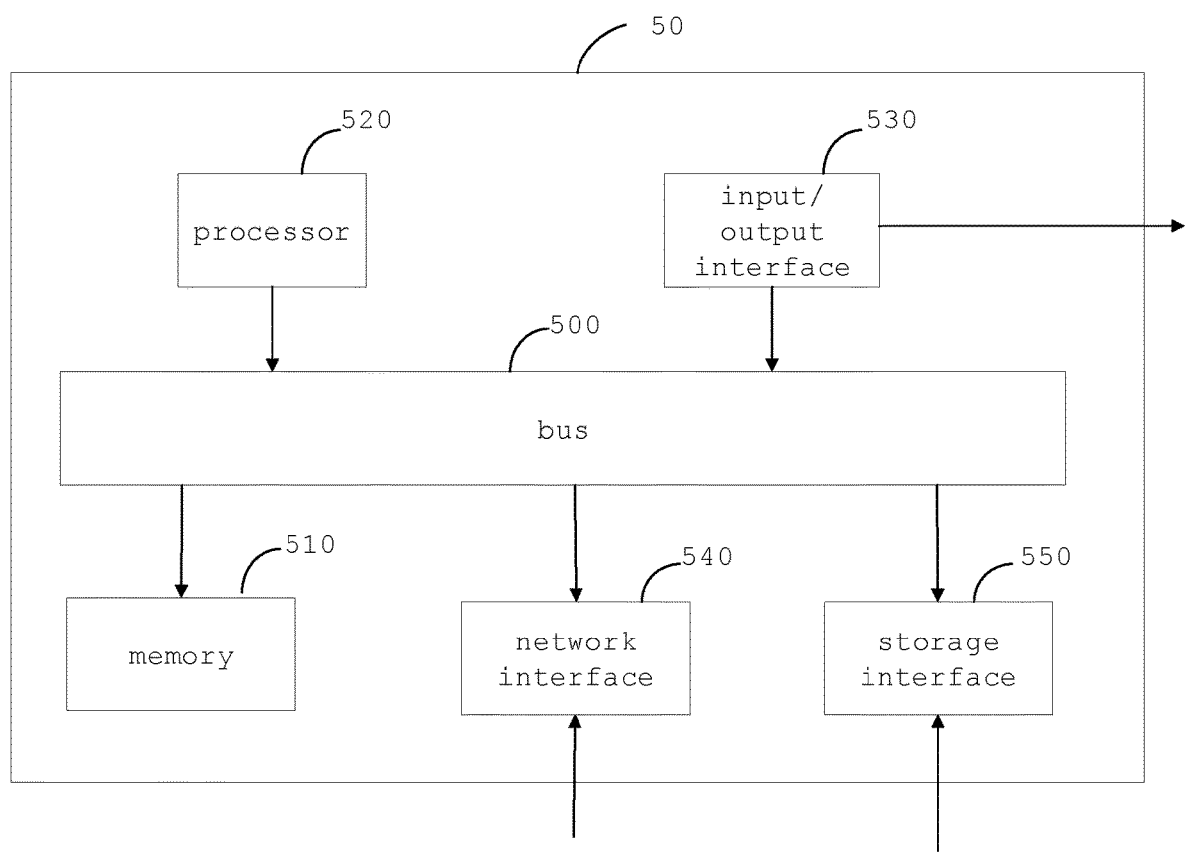
FIG. 5 is a block diagram illustrating a computer system for implementing some embodiments of the present disclosure.

Various exemplary embodiments of the present disclosure will now be described in detail with reference to the accompanying drawings. It should be noted that: the relative arrangement, numerical expressions, and numerical values of components and steps set forth in these embodiments do not limit the scope of the present disclosure unless specifically stated otherwise.

Meanwhile, it should be understood that a size of each portion shown in the drawings is not drawn to an actual scale for the convenience of description.

The following description of at least one exemplary embodiment is merely illustrative in nature and is in no way taken as any restriction on this disclosure and its application or use.

Techniques, methods, and devices known to one of ordinary skill in the related art may not be discussed in detail but are intended to be part of the specification where appropriate.

In all examples shown and discussed herein, any specific value should be construed as exemplary only and not as limiting. Thus, another example of the exemplary embodiment can have a different value.

It should be noted that: similar reference numbers and letters refer to similar items in the following drawings, and thus, once a certain item is defined in one drawing, it does not need to be discussed further in subsequent drawings.

In the related art, static analysis lacks detection capabilities for a use scene of permission and a use scene of privacy leakage in a running environment of android application, so that accuracy and comprehensiveness of detection are poor, and dynamic behavior analysis easily causes interruption of application running due to program popup, so that the accuracy and comprehensiveness of the detection are affected. Based on this, the present disclosure provides a detection method, capable of improving the accuracy and comprehensiveness of the detection. The detection is a detection related to privacy leakage.

FIG. 1 is a flow diagram illustrating a detection method according to some embodiments of the present disclosure.

As shown in FIG. 1, the detection method comprises: step S110, performing static taint analysis on an application to be detected to obtain at least one static taint propagation path; step S120, performing static analysis on the application to be detected to obtain a static analysis result; step S130, performing dynamic behavior analysis on the application to be detected to obtain a dynamic behavior analysis result; step S140, acquiring communication flow data in an entire lifetime of the application to be detected; step S150, determining sensitive information and a sensitive information category that correspond to the communication URL (Uniform Resource Locator), as a flow analysis result; and step S160, fusing the static analysis result, the dynamic behavior analysis result, and the flow analysis result to obtain a detection result. For example, the above steps S110 to S160 can be performed by a detection apparatus. For example, the detection method is performed by the detection apparatus.

In the step S110, the static taint analysis is performed on the application to be detected to obtain the at least one static taint propagation path. Each static taint propagation path comprises a source interface identification and a destination interface identification. In some embodiments, the interface identification can be determined according to an interface name.

In some embodiments, the above step S110 can be implemented in the following manner.

Firstly, according to a call relation between functions in an application program of the application to be detected, a function call graph of the application to be detected is determined. The function call graph comprises a plurality of nodes, wherein each node represents one interface, the nodes are connected by edges, and each edge represents a call relation between the nodes. For example, the function call graph can be constructed by using a Java analysis framework, soot. The interface is an application programming interface (API).

Then, according to a pre-configured source (taint source) function table and sink (taint sink) function table, the static taint analysis is performed on the above determined function call graph by using a static analysis framework 'FlowDroid', to obtain at least one reachable path 'privacyPaths' from a source function to a sink function, as the static taint propagation path. The source function table and the sink function table can be configured according to business requirements.

In the step S120, according to permission-related information of at least one privacy-related interface, permission-related information of at least one third-party SDK (Software Development Kit), and the at least one static taint propagation path, the static analysis is performed on the application to be detected to obtain the static analysis result.

In some embodiments, the permission-related information of each privacy-related interface comprises a privacy-related interface identification and other interface permission-related information. For example, the other interface permission-related information can comprise at least one of a permission level, an interface name, an interface privacy path, or interface function information.

In some embodiments, the permission-related information of the at least one privacy-related interface is stored in an interface permission mapping table.

For example, the interface permission mapping table is in a JSON (JavaScript Object Notation) format:

```
"HIGH" :{
 ' getLatitude( )' :{
  ' APIName' : ' android.location.Location : double getLatitude( )
  ,
  ' Describe' : ' get latitude'
  ' Permission' : ' android.permission.ACESS_FINE_LOCATION'
 },
 ' getLongitude( ) ' :{
  ' APIName ' : ' android.location.Location : double
  getLongitude( )'
  ' Describe' : ' get longitude'
  ' Permission' : ' android.permission.ACESS_FINE_LOCATION'
 },
 ......
}.
```

The interface permission mapping table comprises a plurality of privacy-related interface identifications (for example, getLatitude ( ), getLongitude ( )), permission levels (for example, high-risk permission 'HIGH', middle-risk permission 'MIDDLE', low-risk permission 'LOW') corresponding to the privacy-related interface identifications, names (for example, a value corresponding to API-Name: android.location.Location: double getLatitude( ), android.location.Location: double getLongitude( )) of privacy-related interfaces, function information (for example, a value corresponding to Describe: get longitude, get latitude) of the privacy-related interfaces, and actual permission information (for example, a value corresponding to Permission: android.permission.ACESS_FINE_LOCATION) of the privacy-related interfaces. One permission level can correspond to one or more privacy-related interfaces. The actual permission information of the privacy-related interface is permission information actually used when the privacy-related interface is called.

The interface permission mapping table is, on the basis of data provided by PScout, formed into a complete interface permission mapping table by analyzing and extracting all methods, fields, parameters and the like in a Google Android developer document that need permissions to call and supplementing and perfecting privacy-related interfaces that the PScout does not have according to the extracted privacy-related interface.

For example, for each interface in the developer document, in a case where the interface has an permission limit or a parameter or field of a function of the interface has an permission limit, the interface is determined as a privacy-related interface, and the privacy-related interface is stored into the interface permission mapping table.

In some embodiments, the permission-related information of each third-party SDK comprises an SDK identification, at least one SDK privacy path in which the third-party SDK is located, and other SDK permission-related information. For example, the other SDK permission-related information comprises SDK function information, actual permission information of the SDK. The SDK identification is, for example, an SDK name. The actual permission information of the SDK is permission information actually used when the SDK is called. The SDK privacy path is a program storage path of the third-party SDK that is obtained by third-party SDK identification technology, which can also be called a feature vector.

In some embodiments, the permission-related information of the at least one third-party SDK is stored in a third-party SDK permission mapping table.

For example, the third-party SDK permission mapping table can be stored in a JSON form. A certain item in the third-party SDK permission mapping table is:

```
' weibo_login' :{
    ' description' : ' weibo SDK' ,
    ' features' :{
    ' sdk_key' :{
    ' com/sina/weibo'
    ' com/weibo'
},
    ' function' :{
' sina weibo open platform SDK provides a developer with an
interface for accessing weibo, and provides functions such as
user identity identification, social relationship import,
content sharing and propagation, and aggregation and import of
high-quality content'
},
' permission' :{
    ' android_permission_READ_PHONE_STATE'
},
......
}
}
``` where 'weibo_login' is an SDK identification, a value 'weibo SDK' corresponding to 'description' is descriptive information of SDK, and 'features' is feature information of the SDK. The SDK feature information comprises at least one SDK privacy path ('com/sina/weibo' and 'com/weibo' that correspond to 'SDK_key'), SDK function information ('sina weibo open platform SDK provides a developer with an interface for accessing weibo, and provides functions such as user identity identification, social relationship import, content sharing and propagation, and aggregation and import of high-quality content' corresponding to 'function'), and actual permission information ('android_permission_READ_PHONE_STATE' corresponding to 'permission') of the SDK.

The above step S120 is implemented, for example, in a manner shown in FIG. 2.

FIG. 2 is a flow diagram illustrating performing static analysis on the application to be detected to obtain a static analysis result according to some embodiments of the present disclosure.

As shown in FIG. 2, the performing static analysis on the application to be detected to obtain a static analysis result comprises steps S121 to S122.

In the step S121, according to the permission-related information of the at least one privacy-related interface, the permission-related information of the at least one third-party SDK, and the at least one static taint propagation path, static privacy context information of the each static taint propagation path is constructed.

The above step S121 is implemented, for example, in the following manner.

Firstly, for the each static taint propagation path, in a case where the source interface identification belongs to the privacy-related interface identification in the permission-related information of the at least one privacy-related interface, other interface permission information corresponding to the source interface identification is acquired. In some embodiments, in a case where the source interface identification does not belong to privacy-related interface identification in permission-related information of any privacy-related interface, other static taint propagation paths are directly processed.

Secondly, a path where a destination interface corresponding to the destination interface identification of each static taint propagation path is located is acquired.

Then, in a case where the path where the destination interface is located belongs to the at least one SDK privacy path in the permission-related information of the at least one third-party SDK, other SDK permission information corresponding to the path where the destination interface is located is acquired.

Finally, according to the source interface identification, the other interface permission information corresponding to the source interface identification, the destination interface identification, the path where the destination interface is located, and the other SDK permission information corresponding to the path where the destination interface is located, the static privacy context information of the each static taint propagation path is constructed.

For example, the static privacy context information in this case can be subjected to formatted storage:

PrivacyContextStatic1={SourceAPI, SourceAPiDescription, SourceAPiLocation, permission, DestinionAPI, DestinionAPIDescription, DestinionLocation, XXSDK}, where 'SourceAPI' represents a source interface identification (corresponding to a privacy-related interface called to acquire privacy information), 'SourceAPiDescription' represents function description information of the source interface identification, 'SourceAPiLocation' represents an interface privacy path of a source interface, 'Permission' represents permission (actual permission information of the privacy-related interface) required for acquiring the above privacy information, 'DestinioneAPI' represents a call party (destination interface identification) of the privacy information, 'DestinionAPIDescription' represents function information of a destination interface, 'Destinionlocation' represents a location (SDK privacy path) of the destination interface, 'XXSDK' represents that a main body for calling the destination interface to acquire the source interface is a certain third-party SDK, and the 'XXSDK' here is a name of the specific third-party SDK.

In some embodiments, in a case where the path where the destination interface is located does not belong to the at least one SDK privacy path in the permission-related information of the at least one third-party SDK, the static privacy context information of each static taint propagation path is constructed according to the source interface identification, the other interface permission information corresponding to the source interface identification, the destination interface identification, and the path where the destination interface is located.

For example, the static privacy context information in this case can be subjected to formatted storage:

PrivacyContextStatic2={SourceAPI, SourceAPiDescription, SourceAPiLocation, permission, DestinionAPI, DestinionAPIDescription, DestinionLocation, APP}, where unlike the above static privacy context information 'PrivacyContextStatic1', 'PrivacyContextStatic2' replaces 'XXSDK' in the 'PrivacyContextStatic1' with 'APP', which indicates that a main body for calling a destination interface to obtain a source interface is the application to be detected itself. Part of the 'PrivacyContextStatic2' that is the same as that of the 'PrivacyContextStatic1' will not be repeated here.

In some embodiments, the permission level can also be stored into the static privacy context information. From the static privacy context information, it can be determined that the source interface, at which location, applies for what permission and acquires what personal information, the acquired personal information is also acquired by which destination interface, and whether a main body of the destination interface is the SDK or the application to be detected. The detection is more comprehensive.

In step S122, static analysis is performed on the application to be detected by using the static privacy context information of the at least one static taint propagation path, to obtain the static analysis result.

In some embodiments, the static analysis can comprise a privacy type determination. The performing static analysis on the application to be detected by using the static privacy context information of the at least one static taint propagation path comprises: determining, according to a correspondence between a privacy type and the actual permission information, and actual permission information in the static privacy context information of the each static taint propagation path, a privacy type of the static privacy context information of the each static taint propagation path, as a part of the static analysis result.

For example, each type of actual permission information corresponds to one privacy type. Different actual permission information can correspond to one same privacy type. In some embodiments, the privacy type comprises phone privacy, location privacy, sensor privacy, camera privacy, calendar privacy, contact privacy, SMS privacy, storage privacy, microphone privacy, call history privacy, other non-sensitive information, and the like.

For example, matching operation can be performed on the actual permission information in the static privacy context information of the each static taint propagation path and the actual permission information in the plurality of correspondences, to obtain the privacy type corresponding to the actual permission information in the static privacy context information of the each static taint propagation path, as the privacy type of the static privacy context information of the each static taint propagation path. For example, after the above operation, the privacy type corresponding the 'PrivacyContextStatic1' is determined as phone privacy, and the result can be saved as (PrivacyContextStatic1, phone privacy). This result can be used as a part of the static analysis result.

In some embodiments, the static analysis can also comprise redundant permission determination. The other interface permission information comprises actual permission information. The actual permission information is permission information actually used when the privacy-related interface is called.

The performing static analysis on the application to be detected by using the static privacy context information of the at least one static taint propagation path comprises: acquiring at least one piece of manifest permission information of the application to be detected, and for each piece of manifest permission information, in a case where actual permission information in static privacy context information of any static taint propagation path is not the manifest permission information, determining that the manifest permission information belongs to a redundant permission. The determination result can be used as a part of the static analysis result. The manifest permission information characterizes permission information possibly used by the application to be detected in the lifetime.

In some embodiments, the performing static analysis of the application to be detected by using the static privacy context information of the at least one static taint propagation path further comprises: for the each piece of manifest permission information, in a case where the actual permission information in static privacy context information of at least one static taint propagation path is the manifest permission information, determining that the static privacy context information of the at least one static taint propagation path belongs to a use scene of the manifest permission information corresponding to the actual permission information, as a part of the static analysis result.

For example, first, a set, 'Manifest-Permissions', of at least one piece of manifest permission information of an application to be detected is acquired, and a comparison (matching) operation is performed on each piece of manifest permission information, 'Manifest-Permission', in the set and actual permission information, a field 'permission', in static privacy context of each static taint propagation path.

In a case where the manifest permission information does not match the actual permission information, the field 'permission', in the static privacy context of any static taint propagation path, the manifest permission information, 'Manifest-Permission', is a redundant permission. For example, the determination result can be stored as (Manifest-Permission, redundant permission), as a part of the static analysis result.

In a case where the manifest permission information matches the actual permission information, the field 'permission', in the static privacy context information of at least one static taint propagation path, the static privacy context information of the at least one static taint propagation path is a use scene of the manifest permission information corresponding to the matched actual permission information. For example, the determination result can be stored as (PrivacyContextStatic1, use scene of 'Manifest-Permission'), as a part of the static analysis result.

In some embodiments, the static analysis can also comprise redundant path determination.

The performing static analysis on the application to be detected by using the static privacy context information of the at least one static taint propagation path comprises: acquiring at least one piece of manifest permission information of the application to be detected, and for the actual permission information in the static privacy context information of the each static taint propagation path, in a case where the actual permission information does not belong to the at least one piece of manifest permission information, determining that the static privacy context information of the each static taint propagation path belongs to a redundant path, as a part of the static analysis result.

Taking the set, 'Manifest-Permissions', of the at least one piece of manifest permission information of the application to be detected as an example, for the static privacy context information, 'PrivacyContextStatic1', in a case where the actual permission information, the field 'permission', does not belong to any manifest permission information in the set, 'Manifest-Permissions', it can be determined that the static privacy context information, 'PrivacyContextStatic1', belongs to a redundant path. For example, the determination result can be stored as (PrivacyContextStatic1, redundant path), as a part of the static analysis result.

In some embodiments, the performing static analysis on the application to be detected by using the static privacy context information of the at least one static taint propagation path further comprises: in a case where the actual permission information belongs to the at least one piece of manifest permission information, determining that the static privacy context information of the each static taint propagation path belongs to a use scene of manifest permission information corresponding to the actual permission information, as a part of the static analysis result. The determination result can also be stored as (PrivacyContextStatic1, use scene of Manifest-Permission).

Returning to FIG. 1, in the step S130, the dynamic behavior analysis is performed on the application to be detected to obtain the dynamic behavior analysis result.

In some embodiments, the above step S130 is implemented in the following manner.

Firstly, in a process of running the application to be detected, a plurality of preset privacy-related interface functions are monitored to obtain dynamic privacy context information corresponding to each privacy-related interface function, as a part of the dynamic behavior analysis result. For example, the plurality of privacy-related interface functions can be monitored by using a HOOK framework that is implemented by a Xposed framework. For example, the dynamic privacy context information comprises a privacy-related interface identification, a privacy type, actual permission information of a privacy-related interface, call time, a privacy type, parameter information, a call return result, stack information triggered by a call, and the like.

For example, some information of the privacy-related interface is pre-configured. Part of the configuration information is as follows:

```
"hookConfigs":{
{
"class_name": "android.provider.CalendarContract.Attendees"
,
"method": "query",
"thisObject": "false",
"type": "calendar",
"permission": "READ_CALENDAR",
},
....
}
``` where 'hookConfigs' represents one set of configuration information. A field 'class_name' is a privacy-related interface identification. A field 'method' is a privacy-related function name. 'thisObject' is a type of an object, and a value 'false' identifies that the privacy-related interface is private. A field 'Type' is a privacy type. A field 'Permission' is actual permission information of the privacy-related interface.

For example, the dynamic privacy context information is denoted as 'PrivacyDynamicContext'. PrivacyDynamicContext={API, permission, type, timestamp, args, result, stacks}, where 'API' represents an actually called privacy-related interface identification (for example, name), 'Permission' represents a permission (actual permission information) required for calling the privacy-related interface, 'timemap' represents a time (call time) when the privacy-related interface is called, 'type' represents a privacy type, 'args' represents a parameter (if there is no parameter, the field is null) of the privacy-related interface, 'result' represents a call return result (if no result is returned, the field is null) of the privacy-related interface, and 'stacks' represents stack information triggered when the privacy-related interface is called.

Secondly, in the process of running the application to be detected, a screen state change of the application to be detected is monitored. For example, one custom broadcast can be registered by using android accessibility technology to monitor a screen state change event. This custom broadcast can be named MyAcessability.

Thirdly, in a case where the screen state change occurs, the current running interface is analyzed to obtain property values of a plurality of properties of each control. For example, tree structure analysis on the current running page can be performed by using an inspector function of an automation test framework, appium, to obtain an xpath tree comprising a plurality of control nodes, each control node comprising a plurality of properties.

Usually, appearance of a popup will lead to the screen state change, i.e. the current running interface is, for example, a popup interface. The popup is a popup in the natural running process of the application to be detected. A popup type comprises, but is not limited to, privacy confirmation popup, permission granting popup, guidance continuation popup. These popups can be a system popup or an application popup. For example, the privacy confirmation popup belongs to the application popup, and the permission granting popup belongs to the system popup.

Then, for the each control, a property value of at least one specified property is acquired from the property values of the plurality of properties. For example, the specified property comprises, but is not limited to, control text, control type, control click state, control identification (Identity document, ID), and package to which the control belongs.

Finally, for the each control, in a case where the property value of the at least one specified property meets a preset condition, a target operation corresponding to the preset condition met by the property value is performed on the each control. For example, the preset condition is that a property value belongs to the specified property value. In some embodiments, the specified property value is determined by performing tree structure analysis on a large number of popup pages by using the inspector function of the automation test framework, appium, and analyzing the tree structure. For example, the target operation comprises click operation, swiping operation, input operation, move operation, and the like.

For example, in a case where control text of a control is 'agreed', a package (resource_id number) to which the control belongs is 'com.jingdong.app.mall/a4j', and a control click state is 'clickable', click operation is performed on the control. The automation running process simulates a behavior of a person clicking to agree. Similarly, similar operations can be performed on a control whose control text is 'start', 'continue', etc.

For another example, in a case where a control identification of a control is 'com.android.packageinstaller: id/permission_allow_button', a package to which the control belongs is 'com.samsuang.android.packageinstaller', text of the control is 'allowed', a control type is 'android.widget.button', and a click state of the control is 'clickable', a click operation is performed on the control. The process is an automation running process that simulates the click operation on a permission granting popup.

For another example, a process of user login can also be simulated using an automation running process. In a case where control text of a control is 'login', a control whose control text is 'personal center' is searched for, and a click operation is performed on the control. Then, a control whose control text is 'login by account and password' is searched for, a click operation is performed to switch to an account and password input mode, and then, controls (input boxes) whose control text is 'user name' and 'password' are sequentially searched for, and a preset account and password are respectively filled. Finally, a login button is searched for to perform a click operation.

In the above embodiment, while the dynamic behavior analysis is performed on the application to be detected, it is determined whether the target operation is performed according to the property value of the control by analyzing the current running interface, so that the automation running of the application to be detected is realized, and the running interruption of the application to be detected in the dynamic behavior analysis process that is caused by the popup is avoided, which can improve analysis efficiency of the dynamic behavior analysis, and therefore can improve detection efficiency of the detection.

In some embodiments, the dynamic behavior analysis on the application to be detected can be implemented in the following manner, to obtain the dynamic behavior analysis result.

Firstly, an identification of at least one specific component of the application to be detected and a running sequence of the at least one specific component are acquired. For example, the specific component is a component 'activity'. In some embodiments, the identification of the specific component and its running sequence are acquired through androguard (an open source static analysis tool).

Then, the specific component corresponding to the identification of each specific component is, according to the running sequence, started in sequence, and each started specific component is controlled to run for a specified duration. For example, the each specific component is run by using a command line 'adb -s IP:PORT shell am start-n PACKAGE/ACTIVITY'. In some embodiments, the specified duration is 6 seconds.

Finally, a screen capture operation is performed on a running interface corresponding to the each started specific component, to obtain a screen capture of the running interface, as a part of the dynamic behavior analysis result. For example, the screen capture operation is performed by using a command line 'adb screencap -p/sdcard/screen.png'. In some embodiments, all screen captures can be saved in a specific directory, to provide important evidence supports for a privacy auditor when auditing terms such as "whether the application provides a function of logging off an account", "whether the application provides a feedback channel", "whether privacy terms of the application are clear", and the like.

In the step S140, the communication flow data in the entire lifetime of the application to be detected is acquired, the communication flow data comprising a communication URL and a communication data packet.

In the step S150, according to the communication data packet corresponding to the communication URL, sensitive information and a sensitive information category that correspond to the communication URL are determined, as the flow analysis result.

In some embodiments, the communication data packet corresponding to the communication URL can be detected to obtain sensitive information conforming to a preset rule, as the sensitive information corresponding to the communication URL; and according to a correspondence between the preset rule and the sensitive information category, the sensitive information category corresponding to the communication URL is determined.

For example, the preset rule comprises a regular matching rule for personal privacy data such as mobile phone number, identity card number, email, bank card number, MAC (Media Access Control Address) address, device ID number, and the like. For example, the regular matching rules for the personal privacy data such as mobile phone number, identity card number, email, bank card number, MAC address, device ID number respectively correspond to sensitive information categories such as phone, card, mail, BankCard, mac, deviceid, and the like.

In some embodiments, the flow analysis result can be stored in a structured variable 'analysisFlows'. analysisFlows=(Sensitive,Flag,url), wherein a field 'Sensitive' represents sensitive information, and a value of 'Sensitive' comprises sensitive information such as a specific mobile phone number, an identity card number, etc. 'Flag' represents a sensitive category such as phone, mail, card, BankCard, mac, deviceid, etc. 'url' represents a communication URL. The structured variable is a part of the flow analysis.

For example, the flow data (communication data packets) generated by the application to be detected in the running process can be captured using mitproxy technology, and detection of personal sensitive information acquired from transmission of the application to be detected can be completed using a rule matching engine method.

Before all communication flows of the application to be detected in the process of the entire lifetime from installation, start, and running to end and uninstallation is captured using the mitproxy technology, a proxy IP (Internet Protocol) address and a proxy port are configured first, and then, automation proxy can be realized by using a command line 'Adb settings put global http_proxy ProxyIp:ProxyPort', where 'ProxyIp' is the configured proxy IP, and 'ProxyPort' is the configured proxy port.

In the step S160, the static analysis result, the dynamic behavior analysis result, and the flow analysis result are fused to obtain the detection result. For example, the static analysis result, the dynamic behavior analysis result, and the flow analysis result are stored in one same detection report.

The above embodiment is not only based on the permission-related information of the privacy-related interface, but also in combination with the permission-related information of the third-party SDK, so that the static analysis result is more accurate and comprehensive. In addition, the above embodiment fuses the static analysis, the dynamic analysis, and the flow analysis, which further improves the accuracy and comprehensiveness of the detection.

FIG. 3 is a block diagram illustrating a detection apparatus according to some embodiments of the present disclosure.

As shown in FIG. 3, the detection apparatus 3 comprises a static taint analysis module 31, a static analysis module 32, a dynamic behavior analysis module 33, an acquisition module 34, a determination module 35, and a fusion module 36.

The static taint analysis module 31 is configured to perform static taint analysis on an application to be detected to obtain at least one static taint propagation path, for example, perform the step S110 as shown in FIG. 1. Each static taint propagation path comprises a source interface identification and a destination interface identification.

The static analysis module 32 is configured to perform, according to permission-related information of at least one privacy-related interface, permission-related information of at least one third-party SDK, and the at least one static taint propagation path, static analysis on the application to be detected to obtain a static analysis result, for example, perform the step S120 shown in FIG. 1.

The dynamic behavior analysis module 33 is configured to perform dynamic behavior analysis on the application to be detected to obtain a dynamic behavior analysis result, for example, perform the step S130 shown in FIG. 1.

The acquisition module 34 is configured to acquire communication flow data in an entire lifetime of the application to be detected, for example, perform the step S140 shown in FIG. 1. The communication flow data comprises a communication uniform resource locator (URL) and a communication data packet.

The determination module 35 is configured to determine, according to a communication data packet corresponding to each communication URL, sensitive information and a sensitive information category corresponding to the each communication URL as a flow analysis result, for example, perform the step S150 shown in FIG. 1.

The fusion module 36 is configured to fuse the static analysis result, the dynamic behavior analysis result, and the flow analysis result to obtain a detection result, for example, perform the step S160 shown in FIG. 1.

FIG. 4 is a block diagram illustrating a detection apparatus according to other embodiments of the present disclosure.

As shown in FIG. 4, the detection apparatus 4 comprises a memory 41; and a processor 42 coupled to the memory 41. The memory 41 is used for storing instructions for executing the corresponding embodiment of the detection method. The processor 42 is configured to perform, based on instructions stored in the memory 41, the detection method in any of the embodiments of the present disclosure.

FIG. 5 is a block diagram illustrating a computer system for implementing some embodiments of the present disclosure.

As shown in FIG. 5, the computer system 50 can be represented in a form of a general-purpose computing device. The computer system 50 comprises a memory 510, a processor 520, and a bus 500 that connects different system components.

The memory 510 can comprise, for example, a system memory, non-volatile storage medium, and the like. The system memory has thereon stored, for example, an operating system, an application program, a boot loader, and other programs. The system memory can comprise a volatile storage medium, such as a random access memory (RAM) and/or cache memory. The non-volatile storage medium has thereon stored, for example, instructions to perform the corresponding embodiment of at least one of the detection methods. The non-volatile storage medium includes, but is not limited to, a magnetic disk memory, optical memory, flash memory, and the like.

The processor 520 can be implemented with a discrete hardware component, such as a general-purpose processor, a digital signal processor (DSP), an application specific integrated circuit (ASIC), a field programmable gate array (FPGA) or other programmable logic devices, a discrete gate or transistor, and the like. Accordingly, each module such as the determination module and the determination module can be implemented by a central processing unit (CPU) running instructions in the memory that perform the corresponding steps, or can be implemented by a dedicated circuit that performs the corresponding steps.

The bus 500 can use any of a variety of bus architectures. For example, the bus architecture includes, but is not limited to, an industry standard architecture (ISA) bus, micro channel architecture (MCA) bus, and peripheral component interconnect (PCI) bus.

The computer system 50 can also comprise an input/output interface 530, a network interface 540, a storage interface 550, and the like. These interfaces 530, 540, 550, as well as the memory 510 and the processor 520, can be connected by the bus 500. The input/output interface 530 can provide a connection interface for input/output devices such as a display, a mouse, and a keyboard. The network interface 540 provides a connection interface for various networking devices. The storage interface 550 provides a connection interface for external storage devices such as a floppy disk, a USB flash disk, and an SD card.

Various aspects of the present disclosure are described herein with reference to the flow diagrams and/or block diagrams of the method, apparatus and computer program product according to the embodiments of the present disclosure. It should be understood that each block and a combination of blocks of the flow diagrams and/or block diagrams can be implemented by computer-readable program instructions.

These computer-readable program instructions can be provided to a processor of a general-purpose computer, special-purpose computer, or other programmable apparatuses to produce a machine, such that the instructions, which are executed by the processor, create means for implementing the functions specified in one or more blocks in the flow diagrams and/or block diagrams.

These computer-readable program instructions can also be stored in a computer-readable memory, these instructions causing a computer to work in a specific manner such that an article of manufacture is produced, comprising the instructions which implement the functions specified in one or more blocks in the flow diagrams and/or block diagrams.

The present disclosure can take a form of an entire hardware embodiment, an entire software embodiment, or an embodiment combining software and hardware aspects.

Through the detection method and apparatus and the non-transitory computer readable storage medium in the above embodiment, the accuracy and comprehensiveness of the detection can be improved.

So far, the detection method and apparatus and the non-transitory computer readable storage medium according to the present disclosure have been described in detail. Some details well known in the art have not been described in order to avoid obscuring the concepts of the present disclosure. Those skilled in the art can fully appreciate how to implement the technical solutions disclosed herein according to the above description.

What is claimed is:

1. A detection method, comprising:
    performing static taint analysis on an application to be detected to obtain at least one static taint propagation path, each static taint propagation path comprising a source interface identification and a destination interface identification;
    performing, according to permission-related information of at least one privacy-related interface, permission-related information of at least one third-party software development kit (SDK), and the at least one static taint propagation path, static analysis on the application to be detected to obtain a static analysis result;
    performing dynamic behavior analysis on the application to be detected to obtain a dynamic behavior analysis result;
    acquiring communication flow data in an entire lifetime of the application to be detected, the communication flow data comprising a communication uniform resource locator (URL) and a communication data packet;
    determining, according to the communication data packet corresponding to the communication URL, sensitive information and a sensitive information category that correspond to the communication URL, as a flow analysis result; and
    fusing the static analysis result, the dynamic behavior analysis result, and the flow analysis result to obtain a detection result.

2. The detection method according to claim 1, wherein the performing static analysis on the application to be detected to obtain a static analysis result comprises:
    constructing static privacy context information of the each static taint propagation path according to the permission-related information of the at least one privacy-related interface, the permission-related information of the at least one third-party SDK, and the at least one static taint propagation path; and
    performing static analysis on the application to be detected by using the static privacy context information of the at least one static taint propagation path to obtain the static analysis result.

3. The detection method according to claim 2, wherein the permission-related information of each of the at least one privacy-related interface comprises a privacy-related interface identification and other interface permission-related information, and the permission-related information of each of the at least one third-party SDK comprises an SDK identification, at least one SDK privacy path where the each of the at least one third-party SDK is located, and other SDK permission-related information, and wherein the constructing static privacy context information of the each static taint propagation path comprises:
    for the each static taint propagation path, in a case where the source interface identification belongs to the privacy-related interface identification in the permission-related information of the at least one privacy-related interface, acquiring other interface permission information corresponding to the source interface identification;
    acquiring a path where a destination interface corresponding to the destination interface identification of the each static taint propagation path is located;
    in a case where the path where the destination interface is located belongs to the at least one SDK privacy path in the permission-related information of the at least one third-party SDK, acquiring other SDK permission information corresponding to the path where the destination interface is located; and
    constructing the static privacy context information of the each static taint propagation path according to the source interface identification, the other interface permission information corresponding to the source interface identification, the destination interface identification, the path where the destination interface is located, and the other SDK permission information corresponding to the path where the destination interface is located.

4. The detection method according to claim 3, wherein the static analysis comprises privacy type determination, and the other interface permission information corresponding to the source interface identification comprises actual permission information which is permission information actually used when the at least one privacy-related interface is called, and wherein the performing static analysis on the application to be detected by using the static privacy context information of the at least one static taint propagation path comprises:
    determining, according to a correspondence between a privacy type and the actual permission information, and actual permission information in the static privacy context information of the each static taint propagation path, a privacy type of the static privacy context information of the each static taint propagation path, as a part of the static analysis result.

5. The detection method according to claim 3, wherein the static analysis comprises redundant permission determination, and the other interface permission information corresponding to the source interface identification comprises actual permission information which is permission information actually used when the at least one privacy-related interface is called, and wherein the performing static analysis on the application to be detected by using the static privacy context information of the at least one static taint propagation path comprises:
    acquiring at least one piece of manifest permission information of the application to be detected, the manifest permission information characterizing permission information possibly used by the application to be detected in the lifetime; and
    for each piece of manifest permission information, in a case where the actual permission information in static privacy context information of any static taint propagation path is not the manifest permission information, determining that the manifest permission information belongs to a redundant permission, as a part of the static analysis result.

6. The detection method according to claim 5, wherein the performing static analysis on the application to be detected by using the static privacy context information of the at least one static taint propagation path further comprises:

for the each piece of manifest permission information, in a case where the actual permission information in static privacy context information of at least one static taint propagation path is the manifest permission information, determining that the static privacy context information of the at least one static taint propagation path belongs to a use scene of the manifest permission information corresponding to the actual permission information, as a part of the static analysis result.

7. The detection method according to claim 3, wherein the static analysis comprises redundant path determination, and the performing static analysis on the application to be detected by using the static privacy context information of the at least one static taint propagation path comprises:

acquiring at least one piece of manifest permission information of the application to be detected, the manifest permission information characterizing permission information possibly used by the application to be detected in the lifetime; and for actual permission information in the static privacy context information of the each static taint propagation path, in a case where the actual permission information does not belong to the at least one piece of manifest permission information, determining that the static privacy context information of the each static taint propagation path belongs to a redundant path, as a part of the static analysis result.

8. The detection method according to claim 7, wherein the performing static analysis on the application to be detected by using the static privacy context information of the at least one static taint propagation path further comprises:

in a case where the actual permission information belongs to the at least one piece of manifest permission information, determining that the static privacy context information of the each static taint propagation path belongs to a use scene of manifest permission information corresponding to the actual permission information, as a part of the static analysis result.

9. The detection method according to claim 1, wherein the determining, according to the communication data packet corresponding to the communication URL, sensitive information and a sensitive information category that correspond to the communication URL comprises:

detecting the communication data packet corresponding to the communication URL to obtain sensitive information conforming to a preset rule, as the sensitive information corresponding to the communication URL; and determining the sensitive information category corresponding to the communication URL according to a correspondence between the preset rule and the sensitive information category.

10. The detection method according to claim 1, wherein the performing dynamic behavior analysis on the application to be detected to obtain a dynamic behavior analysis result comprises:

in a process of running the application to be detected, monitoring a plurality of preset privacy-related interface functions to obtain dynamic privacy context information corresponding to each privacy-related interface function, as a part of the dynamic behavior analysis result;

in the process of running the application to be detected, monitoring a screen state change of the application to be detected;

in a case where the screen state change occurs, analyzing a current running interface to obtain property values of a plurality of properties of each control;

for the each control, acquiring a property value of at least one specified property from the property values of the plurality of properties; and for the each control, in a case where the property value of the at least one specified property meets a preset condition, performing, on the each control, a target operation corresponding to the preset condition met by the property value.

11. The detection method according to claim 10, wherein the performing dynamic behavior analysis on the application to be detected to obtain a dynamic behavior analysis result further comprises:

acquiring an identification of at least one specific component of the application to be detected and a running sequence of the at least one specific component;

according to the running sequence, starting the specific component corresponding to the identification of each specific component in sequence, and controlling each started specific component to run for a specified duration; and performing a screen capture operation on a running interface corresponding to the each started specific component, to obtain a screen capture of the running interface, as a part of the dynamic behavior analysis result.

12. A detection apparatus, comprising:

a memory; and a processor coupled to the memory, the processor being configured to perform, based on instructions stored in the memory, the detection method comprising:

performing static taint analysis on an application to be detected to obtain at least one static taint propagation path, each static taint propagation path comprising a source interface identification and a destination interface identification;

performing, according to permission-related information of at least one privacy-related interface, permission-related information of at least one third-party software development kit (SDK), and the at least one static taint propagation path, static analysis on the application to be detected to obtain a static analysis result;

performing dynamic behavior analysis on the application to be detected to obtain a dynamic behavior analysis result;

acquiring communication flow data in an entire lifetime of the application to be detected, the communication flow data comprising a communication uniform resource locator (URL) and a communication data packet;

determining, according to the communication data packet corresponding to the communication URL, sensitive information and a sensitive information category that correspond to the communication URL, as a flow analysis result; and fusing the static analysis result, the dynamic behavior analysis result, and the flow analysis result to obtain a detection result.

13. A non-transitory computer readable storage medium having thereon stored computer program instructions which, when executed by a processor, implement the detection method comprising:

performing static taint analysis on an application to be detected to obtain at least one static taint propagation path, each static taint propagation path comprising a source interface identification and a destination interface identification;

performing, according to permission-related information of at least one privacy-related interface, permission-related information of at least one third-party software development kit (SDK), and the at least one static taint propagation path, static analysis on the application to be detected to obtain a static analysis result;

performing dynamic behavior analysis on the application to be detected to obtain a dynamic behavior analysis result;

acquiring communication flow data in an entire lifetime of the application to be detected, the communication flow data comprising a communication uniform resource locator (URL) and a communication data packet;

determining, according to the communication data packet corresponding to the communication URL, sensitive information and a sensitive information category that correspond to the communication URL, as a flow analysis result; and fusing the static analysis result, the dynamic behavior analysis result, and the flow analysis result to obtain a detection result.

14. The detection apparatus according to claim 12, wherein the performing static analysis on the application to be detected to obtain a static analysis result comprises:

constructing static privacy context information of the each static taint propagation path according to the permission-related information of the at least one privacy-related interface, the permission-related information of the at least one third-party SDK, and the at least one static taint propagation path; and performing static analysis on the application to be detected by using the static privacy context information of the at least one static taint propagation path to obtain the static analysis result.

15. The detection apparatus according to claim 14, wherein the permission-related information of each of the at least one privacy-related interface comprises a privacy-related interface identification and other interface permission-related information, and the permission-related information of each of the at least one third-party SDK comprises an SDK identification, at least one SDK privacy path where the each of the at least one third-party SDK is located, and other SDK permission-related information, and wherein the constructing static privacy context information of the each static taint propagation path comprises:

for the each static taint propagation path, in a case where the source interface identification belongs to the privacy-related interface identification in the permission-related information of the at least one privacy-related interface, acquiring other interface permission information corresponding to the source interface identification;

acquiring a path where a destination interface corresponding to the destination interface identification of the each static taint propagation path is located;

in a case where the path where the destination interface is located belongs to the at least one SDK privacy path in the permission-related information of the at least one third-party SDK, acquiring other SDK permission information corresponding to the path where the destination interface is located; and constructing the static privacy context information of the each static taint propagation path according to the source interface identification, the other interface permission information corresponding to the source interface identification, the destination interface identification, the path where the destination interface is located, and the other SDK permission information corresponding to the path where the destination interface is located.

16. The detection apparatus according to claim 15, wherein the static analysis comprises privacy type determination, and the other interface permission information corresponding to the source interface identification comprises actual permission information which is permission information actually used when the at least one privacy-related interface is called, and wherein the performing static analysis on the application to be detected by using the static privacy context information of the at least one static taint propagation path comprises:

determining, according to a correspondence between a privacy type and the actual permission information, and actual permission information in the static privacy context information of the each static taint propagation path, a privacy type of the static privacy context information of the each static taint propagation path, as a part of the static analysis result.

17. The detection apparatus according to claim 15, wherein the static analysis comprises redundant permission determination, and the other interface permission information corresponding to the source interface identification comprises actual permission information which is permission information actually used when the at least one privacy-related interface is called, and wherein the performing static analysis on the application to be detected by using the static privacy context information of the at least one static taint propagation path comprises:

acquiring at least one piece of manifest permission information of the application to be detected, the manifest permission information characterizing permission information possibly used by the application to be detected in the lifetime; and for each piece of manifest permission information, in a case where the actual permission information in static privacy context information of any static taint propagation path is not the manifest permission information, determining that the manifest permission information belongs to a redundant permission, as a part of the static analysis result.

18. The non-transitory computer readable storage medium according to claim 13, wherein the performing static analysis on the application to be detected to obtain a static analysis result comprises:

constructing static privacy context information of the each static taint propagation path according to the permission-related information of the at least one privacy-related interface, the permission-related information of the at least one third-party SDK, and the at least one static taint propagation path; and performing static analysis on the application to be detected by using the static privacy context information of the at least one static taint propagation path to obtain the static analysis result.

19. The non-transitory computer readable storage medium according to claim 18, wherein the permission-related information of each of the at least one privacy-related interface comprises a privacy-related interface identification and other interface permission-related information, and the permission-related information of each of the at least one third-party SDK comprises an SDK identification, at least one SDK privacy path where the each of the at least one third-party SDK is located, and other SDK permission-related information, and wherein the constructing static privacy context information of the each static taint propagation path comprises:

for the each static taint propagation path, in a case where the source interface identification belongs to the privacy-related interface identification in the permission-related information of the at least one privacy-related interface, acquiring other interface permission information corresponding to the source interface identification;

acquiring a path where a destination interface corresponding to the destination interface identification of the each static taint propagation path is located;

in a case where the path where the destination interface is located belongs to the at least one SDK privacy path in the permission-related information of the at least one third-party SDK, acquiring other SDK permission information corresponding to the path where the destination interface is located; and constructing the static privacy context information of the each static taint propagation path according to the source interface identification, the other interface permission information corresponding to the source interface identification, the destination interface identification, the path where the destination interface is located, and the other SDK permission information corresponding to the path where the destination interface is located.

20. The non-transitory computer readable storage medium according to claim 19, wherein the static analysis comprises privacy type determination, and the other interface permission information comprises actual permission information which is permission information actually used when the privacy-related interface is called, and wherein the performing static analysis on the application to be detected by using the static privacy context information of the at least one static taint propagation path comprises:

determining, according to a correspondence between a privacy type and the actual permission information, and actual permission information in the static privacy context information of the each static taint propagation path, a privacy type of the static privacy context information of the each static taint propagation path, as a part of the static analysis result.

\* \* \* \* \*